United States Patent
Baumgartner et al.

(10) Patent No.: US 6,564,913 B2
(45) Date of Patent: May 20, 2003

(54) BRAKE DISK/HUB ASSEMBLY FOR VEHICLE DISK BRAKES

(75) Inventors: Johann Baumgartner, Moosburg (DE); Wolfgang Pahle, Heilbronn (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/242,775

(22) Filed: Sep. 13, 2002

(65) Prior Publication Data

US 2003/0006104 A1 Jan. 9, 2003

Related U.S. Application Data

(63) Continuation of application No. PCT/EP01/08793, filed on Jul. 30, 2001.

(30) Foreign Application Priority Data

Sep. 21, 2000 (DE) .......................................... 100 46 705

(51) Int. Cl.⁷ ............................................... B61H 13/36
(52) U.S. Cl. ............................. 188/218 XL; 188/18 A
(58) Field of Search ............................ 188/18 A, 71.5, 188/218 XL, 73.2, 206 R, 73.38; 267/158–164; 192/70.17, 70.19, 70.2, 70.18

(56) References Cited

U.S. PATENT DOCUMENTS

| | | | | | |
|---|---|---|---|---|---|
| 2,764,261 A | * | 9/1956 | Bridges | ................. | 188/73.38 |
| 2,926,760 A | * | 3/1960 | Lucien | ................. | 188/218 XL |
| 3,191,735 A | * | 6/1965 | Wavak | ................. | 192/110 R |
| 3,754,624 A | * | 8/1973 | Eldred | ................. | 188/71.5 |
| 4,149,617 A | * | 4/1979 | Dowell et al. | ........ | 188/218 XL |
| 4,280,597 A | * | 7/1981 | Schorwerth | ........... | 188/218 XL |
| 4,456,099 A | | 6/1984 | Kawaguchi | | |
| 4,856,619 A | * | 8/1989 | Petersen | ................. | 188/18 A |
| 5,310,025 A | * | 5/1994 | Anderson | ................ | 188/73.37 |
| 5,507,367 A | | 4/1996 | Dagh et al. | | |
| 5,851,056 A | * | 12/1998 | Hyde | ................. | 301/6.91 |
| 5,988,613 A | | 11/1999 | Dagh et al. | | |
| 6,035,978 A | * | 3/2000 | Metzen et al. | ......... | 188/218 XL |
| 6,139,215 A | * | 10/2000 | Kuhne et al. | ............... | 403/337 |
| 6,238,137 B1 | * | 5/2001 | Whitworth et al. | ........... | 405/38 |
| 6,305,510 B1 | * | 10/2001 | Bunker | ................. | 188/218 XL |
| 6,457,567 B1 | * | 10/2002 | Bunker | ................. | 188/18 A |
| 6,467,588 B1 | * | 10/2002 | Baumgartner et al. | ....... | 188/218 XL |

FOREIGN PATENT DOCUMENTS

| | | |
|---|---|---|
| DE | 19839844 | 3/2000 |
| DE | 19839763 | 5/2000 |
| DK | 284954 | 10/1983 |
| EP | 0610797 | 8/1994 |
| EP | 0860626 | 8/1998 |
| EP | 0959261 | 11/1999 |
| GB | 2093949 | 1/1982 |
| JP | 53014268 | 2/1978 |
| JP | 08210400 | 8/1996 |
| WO | 97/48919 | 12/1997 |

* cited by examiner

Primary Examiner—Douglas C. Butler
Assistant Examiner—Benjamin A Pezzlo
(74) Attorney, Agent, or Firm—Crowell & Moring LLP

(57) ABSTRACT

The invention relates to a brake disk/hub assembly for vehicle disk brakes comprising a hub and a brake disk, which is arranged thereon in a manner that prevents it from turning. The brake disk is arranged in the axial direction of the hub in such a manner that it can be axially displaced against an elastic pretensioning exerted by a number of spring elements. To this end, each spring element has a retaining section by means of which it is fixed to the hub. Each spring element also comprises at least one spring section, which rests against at least one assigned intermediate element that is essentially arranged between the hub and the brake disk. The inventive design is advantageous by virtue of the fact that the spring elements are not in direct contact with the brake disk thereby effectively preventing the spring elements from becoming thermally overloaded. The functional reliability of the spring elements can thus be maintained over a long period of time.

39 Claims, 4 Drawing Sheets

BRAKE DISK/HUB ASSEMBLY FOR VEHICLE DISK BRAKES

CROSS-REFERENCE TO RELATED APPLICATIONS

This application is a continuation of PCT Application No. PCT/EP01/08793 filed on Jul. 30, 2001.

BACKGROUND AND SUMMARY OF THE INVENTION

The invention relates to a brake disk/hub assembly for vehicle disk brakes, particularly for commercial vehicles, having a hub and a brake disk non-rotatably arranged thereon.

Vehicle disk brakes of this type are used particularly when a uniform braking effect is to be implemented with a good proportioning capability. For this purpose, the brake disk is normally pushed axially onto the brake disk hub, which is frequently also a wheel hub of the vehicle, and is secured. For this purpose, the hub has a cross-sectional design on its outer circumferential surface which is not circular, but preferably has a tooth-shaped contour. In the area of its passage opening, the brake disk has a complementary construction so that a form-closure is obtained which does not permit a mutual rotation of these components and by which the braking torque is therefore transmitted from the brake disk to the hub.

The axial securing of such brake disks on a hub can take place in different fashions. Thus, for example, German Patent Document DE 198 39 844 A1 discloses a brake disk and a pertaining axle hub, in which case the brake disk is coupled by screws to the hub such that it is not axially movable. However, this construction method, which constructively is very simple and reliable per se, has the disadvantage that it allows no compensation of tolerances. This may have a negative influence on the braking behavior as well as on the useful life of the braking elements and of the bearing.

Another method of construction of a brake disk/hub assembly is known from German Patent Document DE 198 39 763 A1. Here also, the brake disk is pushed in a form-locking manner on to and over the hub. Radially externally projecting collars formed on the cams of the hub are used as a stop for the brake disk in the axial direction. In addition, intermediate elements are arranged radially between the hub and the brake disk or on the circumferential side between the cams of the hub and the supporting elements of the brake disk. The torque and force transmission takes place by way of the intermediate elements during the braking operation. The axial fixing of the brake disk on the side situated away from the collars takes place by using a retaining ring. The retaining ring is inserted into a ring grove on the hub and projects radially to the outside such that the brake disk is thereby held in a form-locking manner in the axial direction. As a rule, a slight play of the brake disk exists here in the axial direction, so that a compensating movement can take place in this direction. However, as a result, shock-like loads and more or less controlled movements of the brake disk are also possible which, in turn, has a disadvantageous effect on the useful life of the components.

Furthermore, a brake disk/hub assembly has become known from International Patent Document WO 97/48 919. Here, the brake disk is fixed in the axial direction on one side by a rigid stop in the form of a retaining ring and, on the other side, by a spring-elastic retaining ring. In this case, the spring-elastic retaining ring is constructed in a fully surrounding manner and is screwed to the hub. It has a plurality of bearing surfaces which are distributed on the circumference side and are in contact with the lateral surface of the brake disk. The fastening of this spring-elastic retaining ring to the wheel hub in this construction takes place at a desired large distance from the bearing surfaces on the brake disk, so that a predetermined and not too short spring travel occurs; that is, an axial moving possibility of the brake disk. An axial displacement of the brake disk is therefore possible only against this spring force, in which case shock loads must therefore be buffered and absorbed.

However, this method of construction also has disadvantages. Thus, in the case of external shock loads or large deflections from the normal position, the spring-elastic retaining spring may break as soon as its elastic deforming range has been exceeded. Furthermore, the spring-elastic retaining ring is subjected to considerable thermal loads, which originate from the brake disk which heats up considerably during the braking operation. This thermal load results in a change of the characteristics of the material of the spring-elastic retaining ring and, particularly, of the spring characteristics. Thus, the conditions in this range, that is, the possible axial play of the brake disk during a braking operation, can change because of the thermal effect, so that the brake arrangement becomes less predictable and reliable. The useful life of this spring-elastic retaining ring is therefore relatively low.

It is therefore an object of the invention to further develop a brake disk/hub assembly of the above-mentioned type for vehicle disk brakes, particularly for commercial vehicles, such that the loading of the spring device can be minimized and the reliability of the vehicle disk brake can thereby be increased.

This object is achieved by distributing and arranging a plurality of intermediate elements on an inner circumferential side of the brake disk radially between the hub and the brake disk. A spring device has a plurality of spring elements. Each spring element includes a holding section by which it is fixed on the hub, and at least one spring section supported on at least one assigned intermediate element. The brake disk is axially displaceable against a spring-elastic pretensioning applied by the spring device.

Thus, it is provided according to the invention that a plurality of intermediate elements is arranged which, distributed about the circumference, are each arranged radially between the hub and the brake disk, and in that the spring device has a plurality of spring elements, each spring element having a holding section by which it is fixed to the hub, and at least one spring section which is supported on at least one assigned intermediate element. According to the invention, it is thereby achieved for the first time that the elements of the spring device are no longer directly supported on the brake disk, but rather on the intermediate elements. As a result, the thermal loading of the spring device can be clearly reduced. Simultaneously, a play-free coupling of the brake disk to the hub can be achieved in the unloaded condition, in which case axial forces, if necessary, will be elastically absorbed so that a shock-like loading can be avoided.

Because the spring device has a plurality of spring elements, a still better compensation of manufacturing tolerances, etc. can be achieved. Each spring element acts alone and is unaffected by the adjacent spring element. Should a spring element be damaged, possibly also by an external effect, the other spring elements remain unaffected, that is, as a rule, the damage will not affect the adjacent spring element. The operational reliability or protection against breakdown of the arrangement, as a whole, is therefore increased.

The brake disk/hub assembly according to the invention, while it has a simple construction, is therefore characterized particularly in that the spring device is better protected from thermal and mechanical loads and therefore has a longer useful life.

Advantageous further developments of the invention are described herein.

Thus, a spring device can be arranged on one side of the brake disk, while a fixed stop exists on the other side. This significantly simplifies, in particular, the mounting of the brake disk/hub assembly according to the invention since there a few individual elements and the mounting can take place from one side. However, as an alternative, it is also possible to provide a spring device on both sides of the brake disk.

When the axial displacement of the brake disk is limited to a predetermined extent by a stop device, it can effectively be prevented that the spring device is mechanically overloaded; that is, that a deformation takes place beyond an elastic deformation limit. This further increases the reliability of the arrangement.

In this case, the stop device can be constructed by the holding section of each spring element, so that an additional constructional element can be eliminated. This results in a further simplification, particularly of the mounting. The force in the axial direction, which occurs in this case, will then be absorbed by the fastening device by which the holding section is fixed to the hub.

Thus, the holding section of each spring element can be fixed, for example, by using a screw, on a respective cam of the hub, whereby a reliable connection can be established using devices known per se and therefore in a cost-effective manner.

It is also advantageous for each spring element to have a passage opening with an internal thread through which the screw is screwed for producing a captive preassembled unit, and for each cam in the axial direction of the hub to have an internal thread as well as a duct of a sufficient length for the screw to reach the thread. The screw has a thread-free barrel section as well as a threaded section of a length which is smaller than the length of the duct plus the material thickness of the spring element. As a result of the preassembly of the screw and the spring element permitted thereby, the main mounting of the brake disk/hub assembly according to the invention can be significantly simplified. It is also important in this case that the thread section of the screw is limited to a predetermined length so that the spring element can be placed on the intermediate elements on the brake disk at the desired point and only then does the screw have to be screwed into the cam. The spring element can therefore be positioned before it is fastened.

Furthermore, each spring element can have two spring sections, which extend in opposite directions away from the holding section, so that no one-sided loading occurs at the holding section. The additional advantage that a spring-elastic support can be provided simultaneously at two points can also be achieved in this manner. This further reduces the number of constructional elements whereby the mounting expenditures are reduced.

In addition, each spring element may have a supporting section which is radially supported on the brake disk. This prevents rotation of the spring element when the screws or the like are tightened. This is particularly advantageous when the screw and the spring element are provided as a captive preassembled unit.

Other objects, advantages and novel features of the present invention will become apparent from the following detailed description of the invention when considered in conjunction with the accompanying drawings.

DETAILED DESCRIPTION OF THE DRAWINGS

Figure 1:
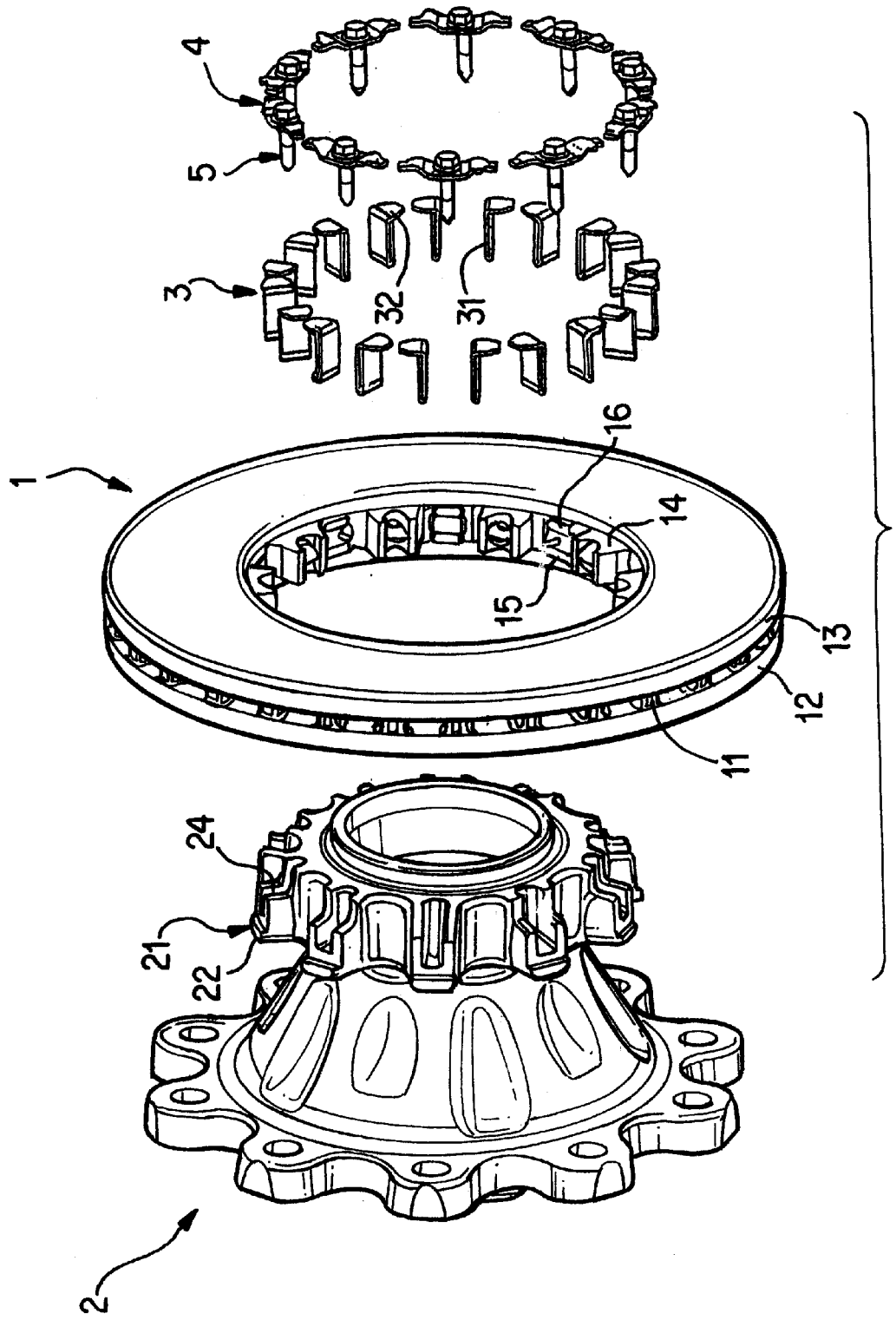
FIG. 1 is an exploded view of the brake disk/hub assembly according to the invention.

According to the representation in FIG. 1, a brake disk/hub assembly for vehicle disk brakes has an internally ventilated disk 1, which can be axially pushed onto a hub 2. In this case, the brake disk 1 is provided in a construction known per se with friction rings 12 and 13 connected by way of a plurality of webs 11. Furthermore, the brake disk 1 has a plurality of supporting elements 14 in an area of the circumferential passage opening of the brake disk, which supporting elements 14 are arranged in a uniformly spaced manner on an inner circumferential side of the brake disk. These supporting elements 14 interact with cams 21 which are arranged in a uniformly spaced manner on the outer circumference of the hub 2.

Figure 5:
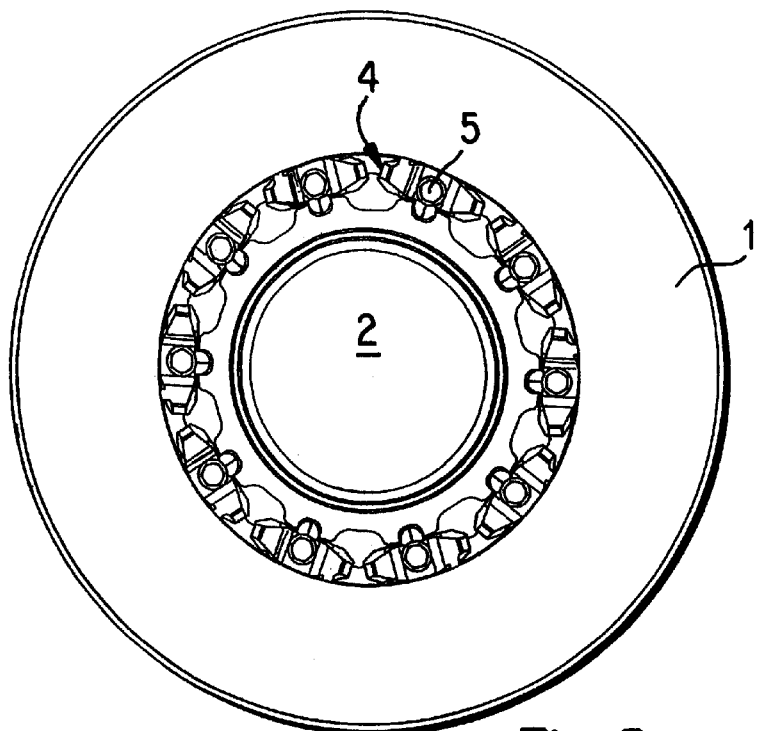
FIG. 5 is a frontal view of the brake disk/hub assembly according to the invention.

In the mounted condition, the cams 21 interact with the supporting elements 14 such that a transmission of the braking torque is permitted between the brake disk and hub. In this case, intermediate elements 3 are arranged radially between the brake disk 1 and the hub 2. In addition, spring elements 4 are provided. The spring elements 4 are coupled to the hub 2 by screws 5 for example, although other fasteners could be used. The mounted condition of the arrangement is illustrated in FIGS. 2 and 5.

Figure 2:
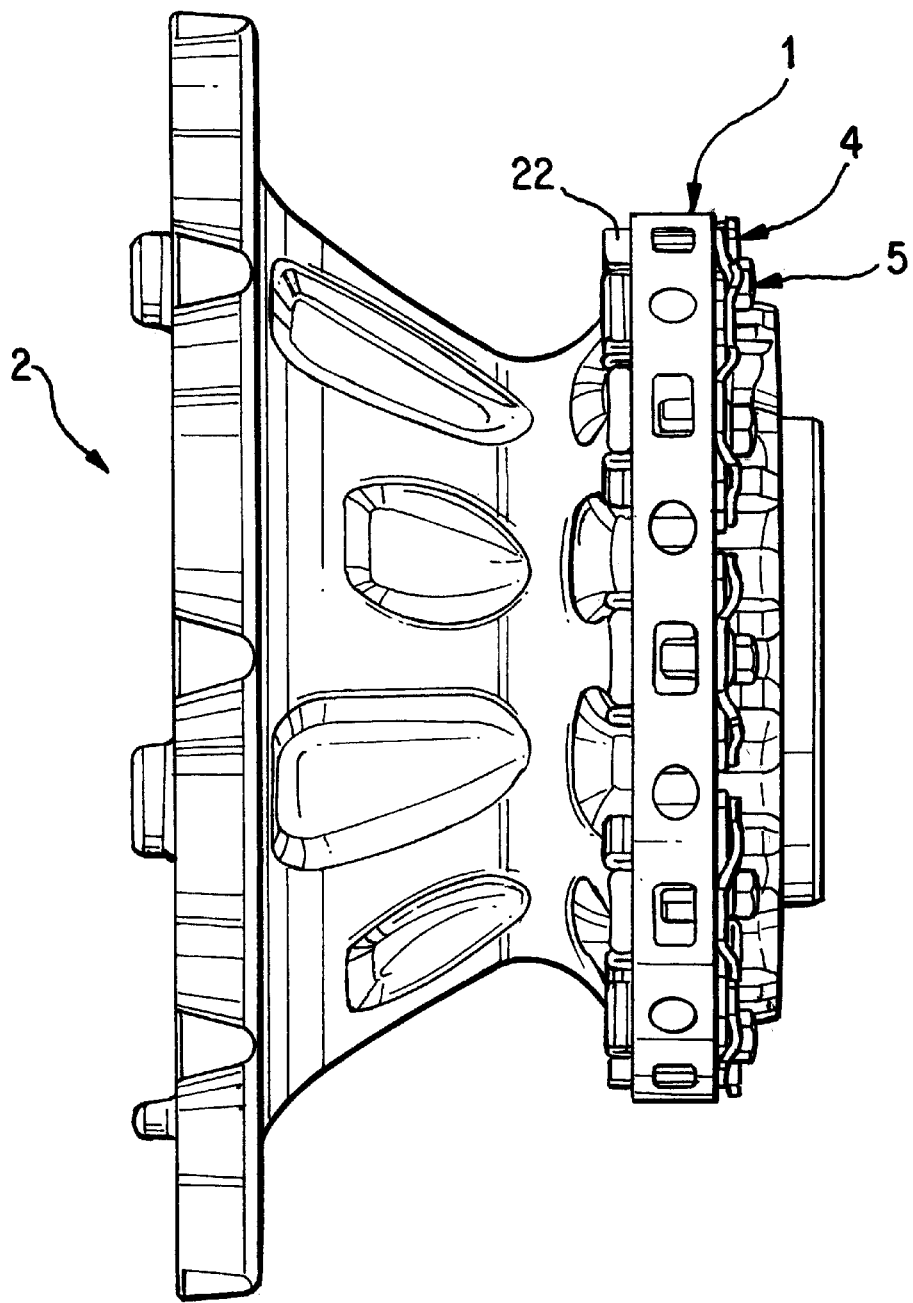
FIG. 2 is a lateral view of the brake disk/hub assembly according to the invention in the mounted condition, a circumferential area of the brake disk being cut off.
Figure 3:
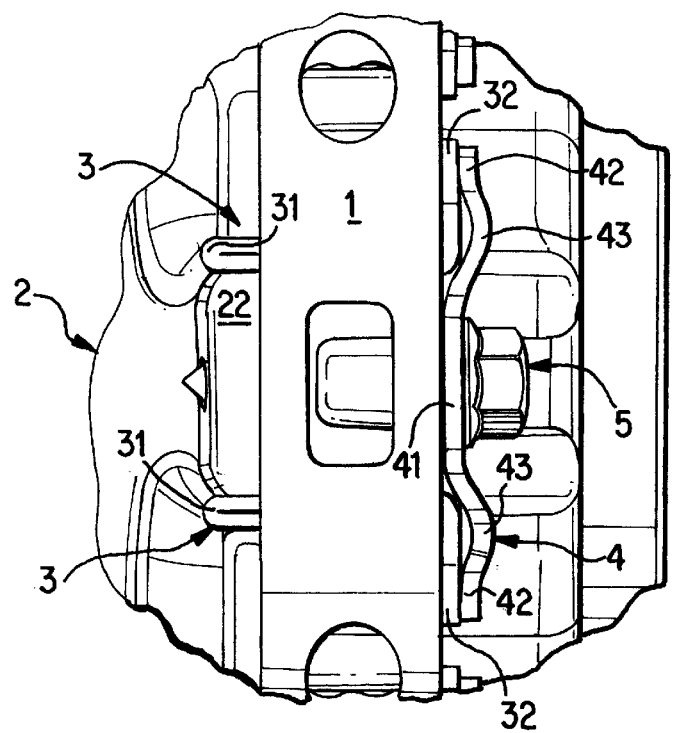
FIG. 3 is a detailed view of a portion of the representation according to FIG. 2.

As illustrated particularly in FIGS. 1 to 3, the intermediate elements 3 are constructed to be bent in such a manner that a main section 31 comes to be situated on the inner circumferential side between the cams 21 and the supporting elements 14, while an angular section 32 rests against a side of the brake disk 1.

As illustrated particularly in FIG. 3, each spring element 45 has a holding section 41 and two spring sections 42 which extend in the opposite directions away from the holding section 41. In order to increase the spring effect and to create clearly defined contact pressure surfaces, the spring sections 42 are connected with the holding section 41 by way of curved intermediate sections 43. Simultaneously, the dimension of the contact pressure surface is therefore limited, whereby a heat transmission from a possibly hot brake disk is limited. The spring element 4 therefore supports the brake disk 1 by way of the intermediate elements 3 against a stop 22 on the hub 2.

Figure 4:
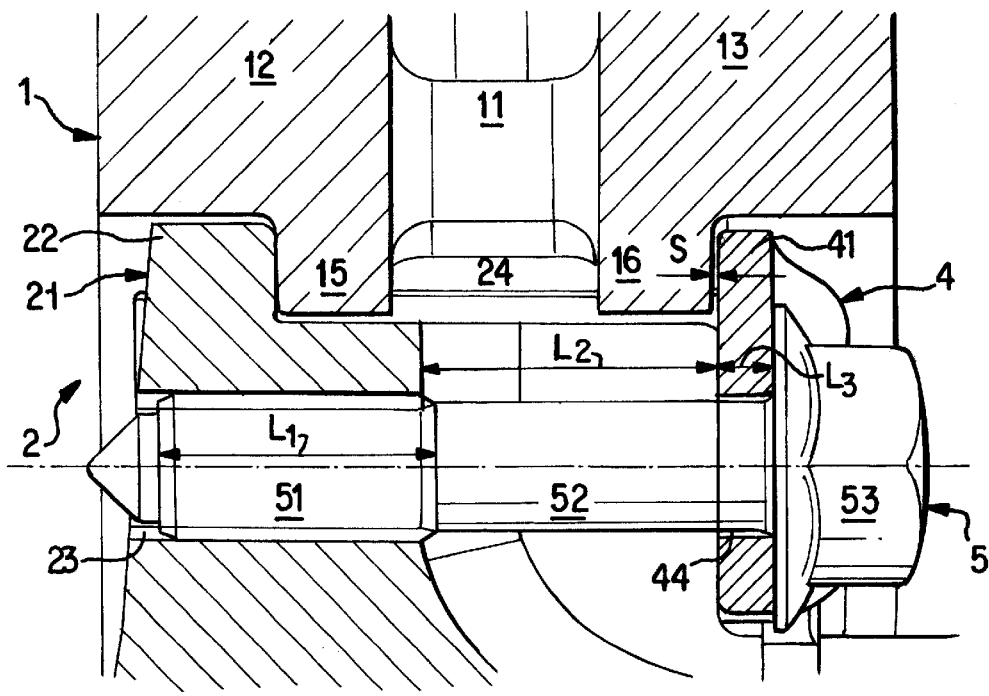
FIG. 4 is a sectional view taken along the screw axis in the transverse direction with respect to the representation in FIG. 3.

The shape of the hub 2 in the receiving area of the brake disk 1 is illustrated particularly in FIGS. 1 and 4. As illustrated here, each cam 21 has, in addition to the stop 22, an internal thread 23 into which the screw 5 is screwed. Furthermore, the cam 21 has a venting duct 24 by which the heat removal between the friction rings 12 and 13 of the brake disk 1 is improved.

As also illustrated in FIG. 4, the brake disk 1 has stops 15 and 16 in the area of the cams 21, the stop 15 resting against the stop 22 of the hub 2 when no axial force acts upon the brake disk 1. Simultaneously, stop 16 is then spaced away by a predetermined extent s from the facing main surface of the holding section 41. This spacing is maintained by the spring-elastic pretensioning of the spring element 4 as long has no axial force is applied which overcomes the spring force of the spring elements 4.

However, should such axial forces occur, they are elastically absorbed by the spring elements 4. In particular, a shock-like loading is prevented on the holding section 41. Only when the distance s between the holding section 41 and the stop 16 has been overcome, will the axial force no longer be absorbed by the spring sections 42 but by the screw 5. However, in this case, the axial forces are damped by the spring force of the spring sections 42 before they are supported by way of the holding section 41 and the screw 5. Because of this support, an overstretching of the spring sections 42 is reliably prevented.

As also illustrated in FIG. 4, each spring element 4 has an internal thread 44 through which a threaded section 51 of the screw 5 is screwed. In addition, the screw 5 has a barrel section 52, which is arranged between a screw head 53 and the threaded section 51. The barrel section 52 is a diameter which is smaller than the minimal diameter of the internal thread 44 in the spring element 4. In addition, the threaded section 51 has a length $L_1$ which is smaller than a length $L_2$ of the venting duct 24 in the hub 2 plus a length $L_3$ which corresponds to the thickness of the holding section 41 of the spring element 4. As a result, the spring element 4 and the screw 5 together can be made available as a preassembled unit, as illustrated in FIG. 1. This simplifies the mounting because this preassembled unit can be placed at the predetermined point on the hub 2, without already having to turn the screw 5 into the internal thread 23 of the hub 2. The screwing-in of the screw 5 can then take place after the alignment of the spring element 4. Simultaneously, the spring element 4 and the screw 5 are mutually coupled by this construction in a captive manner.

Figure 6:
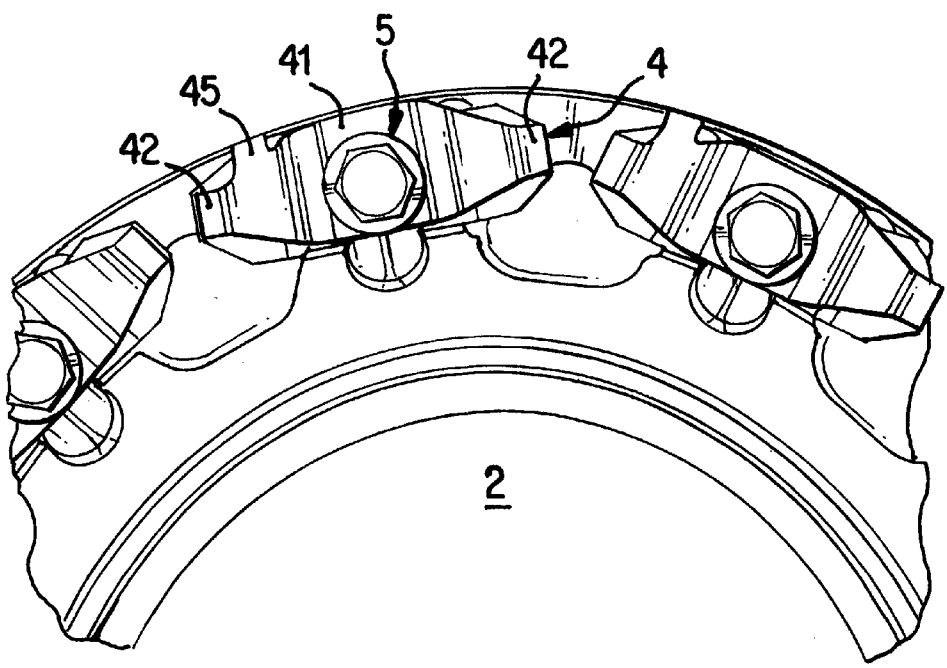
FIG. 6 is a detailed view of a portion of the representation according to FIG. 5.

The lateral view according to FIG. 5 also illustrates that a plurality of spring elements 4, in the present case, ten spring elements 4, are arranged for fixing the brake disk 1 on the hub 2. Particularly, the detailed view according to FIG. 6 also shows that the spring element 4, constructed as a simple bent sheet metal part can, in addition, be provided with a supporting section 45 which is supported on the inner circumferential surface of the passage opening of the brake disk 1 and prevents a rotation of the spring element 4.

In addition to the embodiment explained here, the invention also permits additional designs.

Thus, it is also possible to arrange, instead of the fixed stop 22 on the hub 2, an additional spring device which is constructed, for example, corresponding to the arrangement with the spring elements 4. As a result, an elastic supporting of the brake disk 1 on the hub 2 can be implemented on both sides, in which case the end stop in both axial directions would be reached only after overcoming the spring travel.

Furthermore, it is not required that the holding section 41 be used as a stop for bounding the spring travel. Instead another stop element can also be coupled, for example, be screwed on, or such a stop can be completely eliminated if the occurring axial forces can be reliably absorbed by the spring elements 4.

By means of rivets, bolt connections, etc., the spring elements 4 can also be coupled with the hub 2 instead of with the screw 5.

Furthermore, it is not required that the screws 5 have the above-described special shape. In particular, the spring elements 4 can also be made available separately from the screws 5; that is, not as a preassembled constructional unit.

In the modified construction, it would also be possible for each spring element 4 to have only one spring section which is supported on a possibly adapted intermediate element. The supporting section 45 can then possibly also be eliminated if a rotation of the spring element 4 is prevented in a different manner, or would not be connected with a loss of function.

The invention thereby provides a brake disk/hub assembly for vehicle disk brakes with a hub 2 and a brake disk 1 arranged thereon in a non-rotatable manner, the brake disk 1 being arranged in the axial direction of the hub 2 such that it can be axially displaced against a spring-elastic pretensioning applied by a plurality of spring elements 4. In this case, each spring element 4 has a holding section 41 by which it is fixed to the hub 2. Furthermore, each spring element 4 contains at least one spring section 42 which is supported on at least one assigned intermediate element 3 which is arranged essentially between the hub 2 and the brake disk 1. Here, the construction according to the invention has the special advantage that the spring elements 4 are not in a direct contact with the brake disk 1, so that a thermal overloading of the spring elements 4 can be effectively prevented. The operational reliability of the spring elements 4 can therefore be maintained over a long period of time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Brake disk/hub assembly for a vehicle disk brake having a hub and a brake disk non-rotatably arranged thereon, the brake disk being held in an axial direction of the hub so as to be axially displaceable against a spring-elastic pretensioning, comprising:
   a plurality of intermediate elements arranged and distributed about an inner circumferential side of the brake disk, in each case radially between the hub and the brake disk; and
   a plurality of spring elements fixed on the hub, each spring element having a holding section and at least one spring section supported on at least an assigned one of the intermediate elements.

2. Brake disk/hub assembly according to claim 1, wherein the spring elements are arranged on one side of the brake disk and a fixed stop exists on the other side.

3. Brake disk/hub assembly according to claim 1, wherein the axial displacement of the brake disk is limited to a predetermined extent (s) by a stop device.

4. Brake disk/hub assembly according to claim 2, wherein the axial displacement of the brake disk is limited to a predetermined extent (s) by a stop device.

5. Brake disk/hub assembly according to claim 3, wherein the stop device is formed by the holding section of each spring element.

6. Brake disk/hub assembly according to claim 4, wherein the stop device is formed by the holding section of each spring element.

7. Brake disk/hub assembly according claim 1, wherein the holding section of each spring element is fixed by a screw to a respective cam of the hub.

8. Brake disk/hub assembly according claim 2, wherein the holding section of each spring element is fixed by a screw to a respective cam of the hub.

9. Brake disk/hub assembly according claim 3, wherein the holding section of each spring element is fixed by a screw to a respective cam of the hub.

10. Brake disk/hub assembly according claim 5, wherein the holding section of each spring element is fixed by a screw to a respective cam of the hub.

11. Brake disk/hub assembly according to claim 7, wherein each spring element has an internal thread through which a screw can be screwed for producing a unit preassembled in a captive manner, and wherein each cam, in an axial direction of the hub, has an internal thread as well as a duct of a length through which the screw reaches, the screw having a thread-free barrel section as well as a threaded section of a length ($L_1$) which is smaller than the length ($L_2$) of the duct plus a material thickness ($L_3$) of the spring element.

12. Brake disk/hub assembly according to claim 8, wherein each spring element has an internal thread through which a screw can be screwed for producing a unit preassembled in a captive manner, and wherein each cam, in an axial direction of the hub, has an internal thread as well as a duct of a length through which the screw reaches, the screw having a thread-free barrel section as well as a threaded section of a length ($L_1$) which is smaller than the length ($L_2$) of the duct plus a material thickness ($L_3$) of the spring element.

13. Brake disk/hub assembly according to claim 9, wherein each spring element has an internal thread through which a screw can be screwed for producing a unit preassembled in a captive manner, and wherein each cam, in an axial direction of the hub, has an internal thread as well as a duct of a length through which the screw reaches, the screw having a thread-free barrel section as well as a threaded section of a length ($L_1$) which is smaller than the length ($L_2$) of the duct plus a material thickness ($L_3$) of the spring element.

14. Brake disk/hub assembly according to claim 10, wherein each spring element has an internal thread through which a screw can be screwed for producing a unit preassembled in a captive manner, and wherein each cam, in an axial direction of the hub, has an internal thread as well as a duct of a length through which the screw reaches, the screw having a thread-free barrel section as well as a threaded section of a length ($L_1$) which is smaller than the length ($L_2$) of the duct plus a material thickness ($L_3$) of the spring element.

15. Brake disk/hub assembly according to claim 1, wherein each spring element has two spring sections which extend in opposite directions away from the holding section.

16. Brake disk/hub assembly according to claim 2, wherein each spring element has two spring sections which extend in opposite directions away from the holding section.

17. Brake disk/hub assembly according to claim 3, wherein each spring element has two spring sections which extend in opposite directions away from the holding section.

18. Brake disk/hub assembly according to claim 5, wherein each spring element has two spring sections which extend in opposite directions away from the holding section.

19. Brake disk/hub assembly according to claim 7, wherein each spring element has two spring sections which extend in opposite directions away from the holding section.

20. Brake disk/hub assembly according to claim 11, wherein each spring element has two spring sections which extend in opposite directions away from the holding section.

21. Brake disk/hub assembly according to claim 1, wherein each spring element has a supporting section which is supported in a radial direction on the brake disk.

22. Brake disk/hub assembly according to claim 15, wherein each spring element has a supporting section which is supported in a radial direction on the brake disk.

23. A brake disk/hub assembly for a vehicle disk brake, comprising:
   a hub having an outer circumference;
   a brake disk having an inner circumference, the brake disk being non-rotatably arranged on the outer circumference of the hub;
   a plurality of intermediate elements arranged between the hub and the brake disk; and
   a plurality of spring elements fixed on the hub to provide a spring-elastic pretensioning against axial displacement of the brake disk on the hub, each spring element having a holding section to hold the brake disk on the hub and at least one spring section supported on an assigned one of the intermediate elements.

24. The brake disk/hub assembly according to claim 23, further comprising a fixed stop formed on the hub on one side of the brake disk, the spring elements being arranged on the other side of the brake disk.

25. The brake disk/hub assembly according to claim 23, wherein the holding section of each spring element is fixed by a fastener to a respective cam of the hub.

26. The brake disk/hub assembly according to claim 24, wherein the holding section of each spring element is fixed by a fastener to a respective cam of the hub.

27. The brake disk/hub assembly according to claim 24, wherein each spring element has two spring sections extending in opposite directions away from the holding section.

28. The brake disk/hub assembly according to claim 26, wherein each spring element has two spring sections extending in opposite directions away from the holding section.

29. The brake disk/hub assembly according to claim 23, wherein each spring element has a supporting section supported in a radial direction on the brake disk.

30. The brake disk/hub assembly according to claim 28, wherein each spring element has a supporting section supported in a radial direction on the brake disk.

31. A spring element providing a spring-elastic pretensioning against axial displacement of a brake disk in a brake disk/hub assembly, the spring element comprising:
   a holding section including a fastener adapted to fasten the spring element on a hub;
   at least one spring section extending from the holding section, the spring section being operable to apply a contact pressure to an intermediate element arranged between the hub and brake disk.

32. The spring element according to claim 31, wherein two spring sections are provided, each extending in an opposite direction away from the holding section.

33. The spring element according to claim 31, further comprising a supporting section adapted to engage against the brake disk so as to prevent rotation of the spring element.

34. The spring element according to claim 32, further comprising a supporting section adapted to engage against the brake disk so as to prevent rotation of the spring element.

35. The spring element according to claim 31, wherein the fastener and holding section are preassembled into a unit.

36. The spring element according to claim 31, wherein the fastener is a screw, the screw having a thread-free barrel section and a threaded section, wherein the holding section includes an internal thread through which the threaded section of the screw is threaded to form a preassembled unit.

37. The spring element according to claim 35, wherein the fastener is a screw, the screw having a thread-free barrel section and a threaded section, wherein the holding section includes an internal thread through which the threaded section of the screw is threaded to form the preassembled unit.

38. The spring element according to claim 36, wherein the threaded section of the screw has a length adapted to be smaller than a length of a cam duct arranged on the hub plus a material thickness of the holding section.

39. The spring element according to claim 37, wherein the threaded section of the screw has a length adapted to be smaller than a length of a cam duct arranged on the hub plus a material thickness of the holding section.

* * * * *